United States Patent
Fahnestock et al.

(10) Patent No.: US 12,088,873 B2
(45) Date of Patent: *Sep. 10, 2024

(54) METHODS AND APPARATUS TO IDENTIFY MEDIA BASED ON WATERMARKS ACROSS DIFFERENT AUDIO STREAMS AND/OR DIFFERENT WATERMARKING TECHNIQUES

(71) Applicant: The Nielsen Company (US), LLC, New York, NY (US)

(72) Inventors: Justin Fahnestock, Tampa, FL (US); Ronan Heffernan, Wesley Chapel, FL (US); Muhammad Amir, Palm Harbor, FL (US); Wes Kercher, Tampa, FL (US); Scott Barraclough, New Port Richey, FL (US); John Kistenmacher, Brunswick, ME (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,214

(22) Filed: Jun. 9, 2023

(65) Prior Publication Data

US 2023/0319345 A1    Oct. 5, 2023

Related U.S. Application Data

(63) Continuation of application No. 17/739,524, filed on May 9, 2022, now Pat. No. 11,716,502, which is a
(Continued)

(51) Int. Cl.
*H04N 21/439* (2011.01)
*H04N 21/44* (2011.01)
(Continued)

(52) U.S. Cl.
CPC ..... *H04N 21/4394* (2013.01); *H04N 21/44008* (2013.01); *H04N 21/44222* (2013.01);
(Continued)

(58) Field of Classification Search
CPC ......... H04N 21/25833; H04N 21/6582; H04N 21/44008; H04N 21/2389
See application file for complete search history.

(56) References Cited

U.S. PATENT DOCUMENTS 6,611,607 B1    8/2003    Davis et al.
6,952,774 B1    10/2005    Kirovski et al.
(Continued)

FOREIGN PATENT DOCUMENTS

CN    103413552 A    11/2013
CN    105227311 A    1/2016
(Continued)

OTHER PUBLICATIONS

Telestream, "Using Nielsen Watermarking with Vantage," available at http://www.telestream.net/pdfs/app-notes/app_Vantage_Nielsen.pdf, Sep. 2015, 20 pages.
(Continued)

*Primary Examiner* — Yassin Alata

(57) ABSTRACT

Example apparatus are to assign a first watermark to a first monitoring track and a second monitoring track, the first watermark detected in an audio stream of media. Example apparatus are also to, in response to at least a first threshold number of watermarks being assigned to the first monitoring track, group the first watermark with one or more other watermarks assigned to the first monitoring track to define a first media detection event. Example apparatus are also to, in response to at least a second threshold number of watermarks being assigned to the second monitoring track, group the first watermark with one or more other watermarks
(Continued)

assigned to the second monitoring track to define a second media detection event. Example apparatus are further to cause transmission of the first media detection event and the second media detection event to a data collection facility.

20 Claims, 7 Drawing Sheets

Related U.S. Application Data continuation of application No. 16/907,700, filed on Jun. 22, 2020, now Pat. No. 11,330,328, which is a continuation of application No. 15/994,383, filed on May 31, 2018, now Pat. No. 10,694,243.

(51) Int. Cl.
*H04N 21/442* (2011.01)
*H04N 21/83* (2011.01)
*G10L 19/018* (2013.01)

(52) U.S. Cl.
CPC ....... *H04N 21/44236* (2013.01); *H04N 21/83* (2013.01); *G10L 19/018* (2013.01)

(56) References Cited

U.S. PATENT DOCUMENTS

| | | |
|---|---|---|
| 6,975,746 B2 | 12/2005 | Davis et al. |
| 7,062,069 B2 | 6/2006 | Rhoads |
| 7,197,368 B2 | 3/2007 | Kirovski et al. |
| 7,224,819 B2 | 5/2007 | Levy et al. |
| 7,369,677 B2 | 5/2008 | Petrovic et al. |
| 7,398,395 B2 | 7/2008 | Epstein |
| 7,587,602 B2 | 9/2009 | Rhoads |
| 8,078,301 B2 | 12/2011 | Srinivasan |
| 8,811,655 B2 | 8/2014 | Petrovic et al. |
| 9,055,239 B2 | 6/2015 | Tehranchi et al. |
| 9,093,064 B2 | 7/2015 | Srinivasan et al. |
| 9,418,395 B1 | 8/2016 | Gish et al. |
| 9,547,753 B2 | 1/2017 | Petrovic et al. |
| 9,548,053 B1 | 1/2017 | Basye et al. |
| 10,694,243 B2 | 6/2020 | Fahnestock et al. |
| 11,330,328 B2 | 5/2022 | Fahnestock et al. |
| 2008/0249961 A1 | 10/2008 | Harkness et al. |
| 2011/0066437 A1 | 3/2011 | Luff |
| 2012/0265735 A1 | 10/2012 | McMillan et al. |
| 2013/0007790 A1 | 1/2013 | McMillan |
| 2013/0152139 A1 | 6/2013 | Davis et al. |
| 2014/0059591 A1 | 2/2014 | Terpstra et al. |
| 2014/0114666 A1 | 4/2014 | Rodriguez |
| 2014/0267907 A1 | 9/2014 | Downes et al. |
| 2015/0180989 A1 | 6/2015 | Seth |
| 2015/0319490 A1 | 11/2015 | Besehanic |
| 2016/0057317 A1 | 2/2016 | Zhao et al. |
| 2016/0066005 A1 | 3/2016 | Davis et al. |
| 2016/0140969 A1 | 5/2016 | Srinivasan et al. |
| 2017/0078765 A1 | 3/2017 | Yang et al. |
| 2017/0195716 A1 | 7/2017 | Ramaswamy et al. |
| 2018/0084313 A1 | 3/2018 | Splaine et al. |
| 2018/0191803 A1 | 7/2018 | Turnbull et al. |
| 2018/0220169 A1 | 8/2018 | Yang |
| 2018/0352052 A1 | 12/2018 | Besehanic |
| 2019/0373309 A1 | 12/2019 | Fahnestock et al. |
| 2020/0204875 A1 | 6/2020 | Nielsen et al. |

FOREIGN PATENT DOCUMENTS

| | | |
|---|---|---|
| CN | 105830453 A | 8/2016 |
| WO | 2019231912 A1 | 12/2019 |
| WO | 2020131914 A1 | 6/2020 |

OTHER PUBLICATIONS

United States Patent and Trademark Office, "Non-Final Office Action," issued in connection with U.S. Appl. No. 15/994,383, issued on Jul. 3, 2019, 22 pages.

International Searching Authority, "International Search Report and Written Opinion" issued in connection with PCT application No. PCT/US2019/034174 dated Sep. 18, 2019, 7 pages.

United States Patent and Trademark Office, "Final Office Action," issued in connection with U.S. Appl. No. 15/994,383, issued on Nov. 26, 2019, 19 pages.

United States Patent and Trademark Office, "Notice of Allowance," issued in connection with U.S. Appl. No. 15/994,383, issued on Feb. 12, 2020, 19 pages.

International Searching Authority, "International Preliminary Report on Patentability," issued in connection with International Patent Application No. PCT/US2019/034174, dated Sep. 18, 2019, 6 Pages.

United States Patent and Trademark Office, "Non-Final Office Action", issued in connection with U.S. Appl. No. 16/907,700, issued on May 12, 2021, 18 pages.

United States Patent and Trademark Office, "Final Office Action," mailed in connection with U.S. Appl. No. 16/907,700, dated Sep. 23, 2021, 13 pages.

United States Patent and Trademark Office, "Notice of Allowance and Fee(s) Due," mailed in connection with U.S. Appl. No. 16/907,700, dated Jan. 12, 2022, 9 pages.

Canadian Patent Office, "Notice of Allowance," issued in connection with Canadian patent appl. No. 3,100,616 issued on Jan. 19, 2022, 1 page.

United States Patent and Trademark Office, "Notice of Allowance and Fee(s) Due," mailed in connection with U.S. Appl. No. 16/907,700, dated Feb. 25, 2022, 4 pages.

European Patent Office, "European Search Report," issued in connection with European patent application No. 19810616.3, Jun. 21, 2022, 8 pages.

European Patent Office, "Communication pursuant to Article 94(3) EPC," issued in connection with European patent application No. 19810616.3, Apr. 4, 2023, 7 pages.

United States Patent and Trademark Office, "Non-Final Office Action", issued in connection with U.S. Appl. No. 17/739,524, dated Nov. 14, 2022, 11 pages.

United States Patent and Trademark Office, "Notice of Allowance," issued in connection with U.S. Appl. No. 17/739,524, mailed on Mar. 10, 2023, 8 pages.

The State Intellectual Property Office of People's Republic of China, "First Office Action," issued in connection with Chinese Patent Appl. No. 201980035826.2, dated Aug. 31, 2023, 10 pages. [English machine translation included].

European Patent Office, "Extended European Search Report," mailed Aug. 18, 2022, in connection with European Patent Application No. 19901037.2, 10 pages.

International Searching Authority, "International Search Report," mailed Apr. 20, 2020 in connection with International Patent Application No. PCT/US2019/066915, 3 pages.

International Searching Authority, Written Opinion, mailed Apr. 20, 2020 in connection with International Patent Application No. PCT/US2019/066915, 5 pages.

United States Patent and Trademark Office, Non-Final Rejection, issued Jun. 24, 2020 in connection with U.S. Appl. No. 16/231,060, 11 pages.

United States Patent and Trademark Office, Final Rejection, issued Feb. 11, 2021 in connection with U.S. Appl. No. 16/231,060, 14 pages.

United States Patent and Trademark Office, "Non-Final Office Action", issued in connection with U.S. Appl. No. 16/231,060 on Jun. 10, 2021, 11 pages.

United States Patent and Trademark Office, "Non-Final Office Action", issued in connection with U.S. Appl. No. 17/833,703 on Mar. 10, 2023, 12 pages.

United States Patent and Trademark Office, "Final Office Action", issued in connection with U.S. Appl. No. 17/833,703 on Sep. 27, 2023, 14 pages.

METHODS AND APPARATUS TO IDENTIFY MEDIA BASED ON WATERMARKS ACROSS DIFFERENT AUDIO STREAMS AND/OR DIFFERENT WATERMARKING TECHNIQUES

RELATED APPLICATIONS

This patent arises from a continuation of U.S. patent application Ser. No. 17/739,524, which was filed on May 9, 2022, and which is a continuation of U.S. patent application Ser. No. 16/907,700 (now U.S. Pat. No. 11,330,328), which was filed on Jun. 22, 2020, and which is a continuation of U.S. patent application Ser. No. 15/994,383 (now U.S. Pat. No. 10,694,243), which was filed on May 31, 2018. U.S. patent application Ser. No. 17/739,524, U.S. patent application Ser. No. 16/907,700, and U.S. patent application Ser. No. 15/994,383 are incorporated herein by reference in their entireties. Priority to U.S. patent application Ser. No. 17/739,524, U.S. patent application Ser. No. 16/907,700, and U.S. patent application Ser. No. 15/994,383 is claimed.

FIELD OF THE DISCLOSURE

This disclosure relates generally to watermarking technology, and, more particularly, to methods and apparatus to identify media based on watermarks across different audio streams and/or different watermarking techniques.

BACKGROUND

Digital watermarking is a technical field that uses sophisticated techniques to embed data in media (e.g., audio, video, and/or image data) in a manner that is substantially imperceptible to humans but that can be detected and/or extracted at a later point in time such as when the media is subsequently accessed or presented. One common purpose for watermarking is to enable the automatic detection of media as it is broadcast, aired, streamed, or otherwise provided to audience members accessing the media. In particular, watermarks including media identifying information to enable a media monitoring entity to track what media is provided by a media provider may be embedded in the media. Watermarks may be used to identify the content produced by the media provider and/or to identify advertisements presented along with the media provider generated content.

BRIEF DESCRIPTION OF THE DRAWINGS

In general, the same reference numbers will be used throughout the drawing(s) and accompanying written description to refer to the same or like parts.

DETAILED DESCRIPTION

Figure 1:
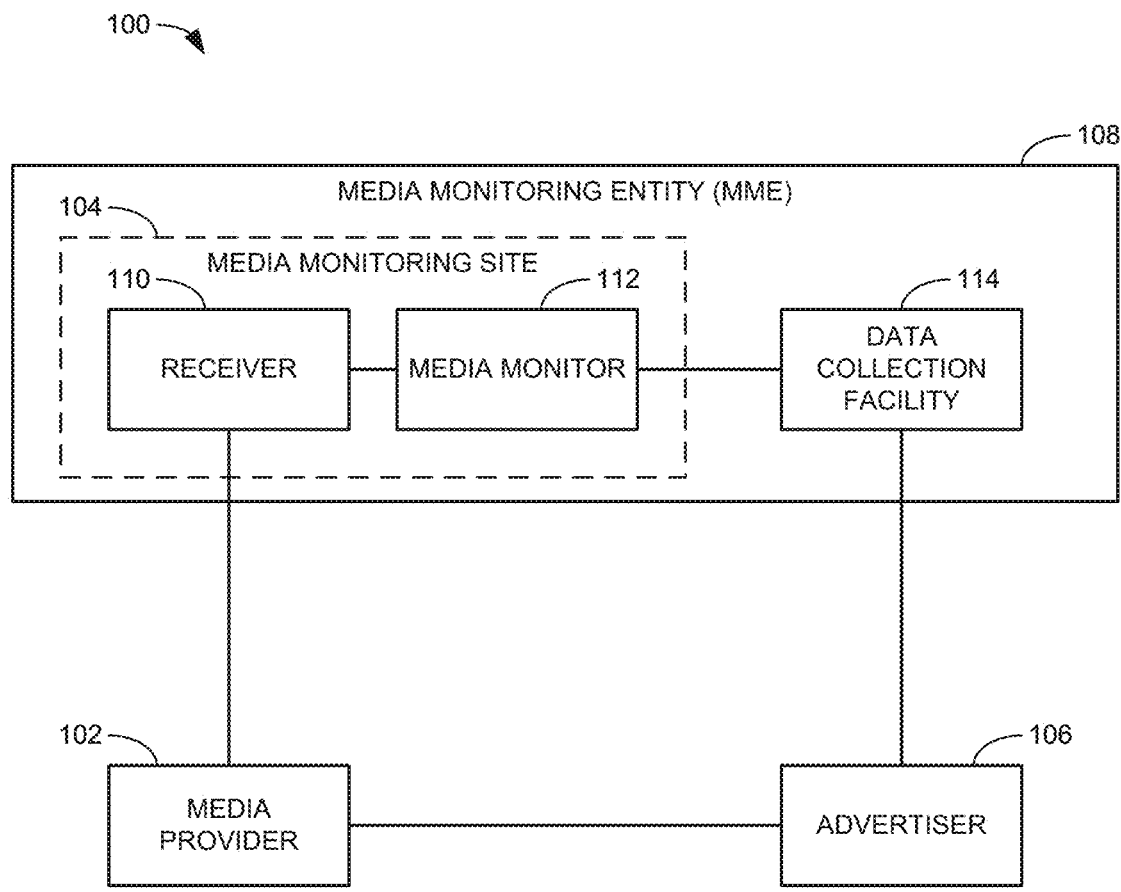
FIG. 1 illustrates an example environment in which teachings disclosed herein may be implemented.

FIG. 1 is an example environment 100 in which teachings disclosed herein may be implemented. The environment 100 of FIG. 1 includes one or more media provider(s) 102 that provide media (e.g., television programming, on-demand media, Internet-based streaming media, advertisements, music, etc.) to one or more media monitoring sites 104. Often, the media provided by the media provider 102 includes content created by the media provider 102 as well as advertisements created by one or more advertiser(s) 106.

As shown in the illustrated example, the media monitoring site 104 is associated with and/or managed by a media monitoring entity (MME) 108, such as The Nielsen Company (US), LLC, to monitor and/or track media provided by the media provider 102.

In some examples, the media monitoring site 104 includes a receiver 110 (e.g., set-top boxes or the like) that receives media from the media provider 102 and transmits the media to a media monitor 112 for processing. In the illustrated example, the receiver 110 is tuned to a known (e.g., designated by the MME 108) channel or station associated with the media provider 102. By designating the station or channel in this manner, the MME 108 can monitor what media is aired on the designating station or channel at any particular point in time. In some examples, media monitoring is implemented to track and/or verify when content produced by the media provider 102 is actually aired. Additionally or alternatively, media monitoring is implemented to track and/or verify when advertisements created by advertisers 106 have been aired on the designated station or channel.

In some examples, the media monitoring site 104 includes multiple receivers 110 tuned to different channels (associated with the same and/or different media provider(s) 102). In some such examples, each receiver may also have a corresponding media monitor 112. In other examples, a single media monitor 112 may collect and/or process the data from more than one receiver 110. Further, in some examples, there may be multiple media monitoring sites each with one or more receivers 110 and/or one or more media monitors 112. More particularly, in some examples, the MME 108 may establish remote media monitoring sites at different geographic locations corresponding to regions where affiliated stations broadcast media for the region (e.g., local television programming, local radio programming, etc.). For purposes of clarity and simplicity, in the illustrated example, only one media monitoring site 104 is shown containing only one receiver 110 tuned to a particular station or channel associated with one media provider 102.

In the illustrated example, the media monitor 112 processes the media received by the receiver 110 to generate media monitoring data that is subsequently transmitted to a central data collection facility 114 associated with the MME 108. In some examples, the media monitoring data is generated based on watermarks embedded in the media.

Watermarking refers to techniques used to identify media such as television broadcasts, radio broadcasts, advertisements (television and/or radio), downloaded media, streaming media, prepackaged media, etc. Existing watermarking techniques identify media by embedding codes (e.g., a watermark), such as media identifying information and/or an identifier that may be mapped to media identifying information, into an audio and/or video component having a signal characteristic sufficient to hide the watermark. As used herein, the terms "code" or "watermark" are used interchangeably and are defined to mean any identification information (e.g., an identifier) that may be transmitted with, inserted and/or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements delivered in any suitable manner (e.g., broadcast, streaming, on-demand, etc.). To identify watermarked media, the watermark(s) are extracted and compared to reference watermarks and/or other metadata that are mapped to media identifying information.

In many instances, a watermark includes both a source identifier (SID) and a timing identifier (collectively referred to herein as media identifying information) to uniquely identify the media in which the watermark is embedded. The SID, as its name implies, identifies the source of the media. For example, the SID may identify a particular media provider 102, a particular station or channel provided by the media provider 102, a particular streaming service associated with the media provider 102, and/or a particular advertiser 106. More particularly, in some examples, the SID may identify a particular watermark encoder provided by the MME 108 to the corresponding media provider 102 or advertiser 106. The MME 108 maintains a database of all SIDs at the data collection facility 114 so that each time a watermark with a particular SID is reported to the data collection facility 114, the MME 108 can look up the SID to identify the associated source of media (e.g., media provider 102, advertiser 106, particular encoder, etc.).

The SID by itself may be insufficient to uniquely identify media because multiple different media items may be encoded with watermarks using the same SID. Accordingly, watermarks also include a timing identifier. In some examples, the timing identifier is a timestamp that indicates the particular time when the watermark was embedded into the media. For purposes of explanation and clarity, a timestamp corresponding to the time when a watermark is encoded into media is referred to herein as an "encoding timestamp." This is in contrast to a timestamp generated by the media monitor 112 when a watermark is detected and/or extracted from the media. A timestamp generated at the time a watermark is detected is referred to herein as a "detecting timestamp." Encoding timestamps are often used in watermarks encoded into media content produced by media providers 102 at the time of airing of the media. In this manner, the encoding timestamp serves to indicate the actual time when the corresponding media was aired.

In other examples, the timing identifier may be a unique value known as a time-in-content (TIC) number that corresponds to a particular time within the media into which the associated watermark is encoded. Different TIC numbers may be designated for different times within the media spaced at periodic intervals (e.g., every second, every two seconds, etc.). Thus, while TIC numbers do not indicate the actual time of encoding (as with an encoding timestamp), they may still indicate a sense of time relative to one another. Furthermore, different TIC numbers are used for each different media item encoded using the same SID such that, when a watermark is detected, the particular media item containing the watermark and the time within the media item can be determined by looking up the SID and associated TIC number. TIC numbers are often used in advertisements because the time of airing is typically not as important as for media content created by media providers because advertisements are usually aired multiple times over the course of an advertising campaign. While encoding timestamps and TIC numbers provide slightly different information, examples disclosed herein may be implemented using watermarks including timing identifiers that are either encoding timestamps or TIC numbers.

Typically, watermarks are encoded into media in a manner that is imperceptible to humans. There are multiple different watermarking techniques that may be implemented to achieve this result. However, to reduce the likelihood that a human will perceive a watermark, most watermarking techniques encode a watermark over a period of time within the media. This limits the frequency at which watermarks may be embedded in media. For example, encoding audio watermarks at a frequency significantly greater than approximately once every two seconds is likely to produce an audible sound that may be perceived by humans.

While a watermark every two seconds may be adequate to identify relatively long media items, this frequency may be insufficient for relatively short media items. One reason for this arises from the technical complexity in identifying watermarks. While the technical field of watermarking used for monitor media is relatively robust and capable of accurately identifying media, it is still possible that the media monitor 112 fails to detect a watermark that was embedded in the media (a false negative). Furthermore, it is not uncommon for a media monitor 112 to incorrectly detect a watermark in media when no such watermark was encoded (a false positive) based on the content of the media itself and/or noise in the media signal. False positives produce extra data that has no value (because it has no meaning) that poses processing burdens on the devices processing the data as well as increasing bandwidth requirements at the data collection facility 114 to receive data associated with the false positives.

One approach to overcoming the limitations of this technology is to identify media based on the detection of a group of at least two watermarks. That is, in some examples, a single watermark is not considered to be a reliable means to identify media unless it is authenticated or validated by at least one additional watermark with consistent media identifying information as the first watermark. A group of watermarks that is sufficient to reliably identify media is referred to herein as a media detection event. In some examples, a media detection event may be based on a group of two watermarks. In other examples, a media detection event may be limited to a threshold number of watermarks that is greater than two.

While defining media detection events to include at least two watermarks may reduce the impact of false positive detection of watermarks, this approach increases the time needed to reliably collect watermarks indicative of media. Furthermore, false negatives increase this time even further. For example, if watermarks are embedded at five second increments within media, a minimum of ten seconds is needed to establish a media detection event. However, some advertisements are less than ten seconds long such that these advertisements would never be detected. Even if the watermarks were embedded at the effective limit of two-seconds apart to provide sufficient time to adequately conceal the watermark from a human, there is still a need for at least four seconds of media to generate a media detection event, and possibly more if one or more of the watermarks are not detected (a false negative).

Not any two or more watermarks are grouped together to define a media detection event. In some examples, for two watermarks to be grouped together as reliably authenticated one another depends upon both watermarks having consistent media identifying information (SID and timing identifier). As used herein, media identifying information from two watermarks is consistent when the SIDs of the watermarks are the same and the timing identifiers (e.g., encoding timestamp or TIC number) of the watermarks are chronologically congruent relative to a time of capture of the associated watermarks (indicated by corresponding detecting timestamps). For convenience of explanation, watermarks with consistent media identifying information are referred to herein as consistent watermarks.

In some examples, the media monitor 112 will generate a detecting timestamp by capturing a wall-clock value at the time the watermark is detected. As explained above, this detecting timestamp generated by the media monitor 112 is distinct from the encoding timestamps corresponding to the timing identifiers in some watermarks. Whereas an encoding timestamp indicates the time when the watermark was encoded by the media provider 102 and/or the advertiser 106, the detecting timestamp indicates the time that the media monitor 112 detected the watermark. Thus, in some examples, timing identifiers (either encoding timestamps or TIC numbers) are chronologically congruent when they are detected in the same chronological order as the detecting timestamps generated by media monitor 112. For example, if the detecting timestamp generated by the media monitor 112 in response to detecting a first watermark is three seconds before the detecting timestamp generated in response to detecting a second watermark, the timing identifiers for the first and second watermarks may be chronologically congruent if the timing identifier for the second watermark indicates a later time than the timing identifier for the first watermark.

In some examples, chronological congruency includes not only chronological order but also temporal spacing. To use the above example, the timing identifiers for the first and second watermarks may be considered congruent only if the second watermark is detected second and within approximately three seconds after the first watermark based on the three second difference between the two detecting timestamps generated by the media monitor 112. In some examples, timing identifiers of different watermarks may be designated as chronologically congruent when their temporal spacing is within some threshold of variability (e.g., +/−2 seconds) of the temporal spacing of the detecting timestamps.

Further, in some examples, the chronological congruency between two watermarks is limited by an upper threshold on the time interval between the watermarks. That is, if the interval between two watermarks exceeds a threshold (e.g., 25 seconds, 30 seconds, 45 seconds, etc.), the watermarks are not chronologically congruent even if the timing identifiers follow one another in the correct chronological order and exhibit a comparable temporal spacing to the time of capture (e.g., the detecting timestamps) of the two watermarks. This threshold is referred to herein as a threshold bridge time. Of course, a series of multiple watermarks may collectively form a single media detection event that extends significantly longer than the threshold bridge time so long as the interval between any two adjacent ones of the watermarks remains within the threshold. In other words, in some examples, a newly detected watermark is compared against the most recent or last watermark detected in a series of consistent watermarks for purposes of chronological congruency without regard to earlier watermarks.

Some existing approaches to watermarking detection further limit media detection events to watermarks encoded using the same watermarking technique. That is, many types of media include multiple watermarks encoded using different techniques. In the past, only the same type of watermarks (e.g., encoded using the same technique) have been compared to identify consistent watermarks. Thus, two watermarks with consistent media identifying information may nevertheless not result in a media detection event if the watermarks are based on different watermarking techniques.

Further, watermarks are typically compared with other watermarks detected in the same audio stream. That is, some forms of media provide multiple audio streams corresponding to a single video stream to offer audio in different languages (e.g., an English audio stream versus a Spanish audio stream) and/or audio in different formats (e.g., stereo versus 5.1 surround sound). In other words, as used herein, different audio streams correspond to different representations of audio associated with the same media item. The different audio streams may be transmitted concurrently with one another (as well as the corresponding video stream). Typically, the different audio streams associated with a particular media item will be separately encoded with watermarks (using one or more different watermarking techniques). Often, the different audio streams are independently monitored so that only consistent watermarks within a single audio stream are identified to define a particular media detection event.

Figure 2:
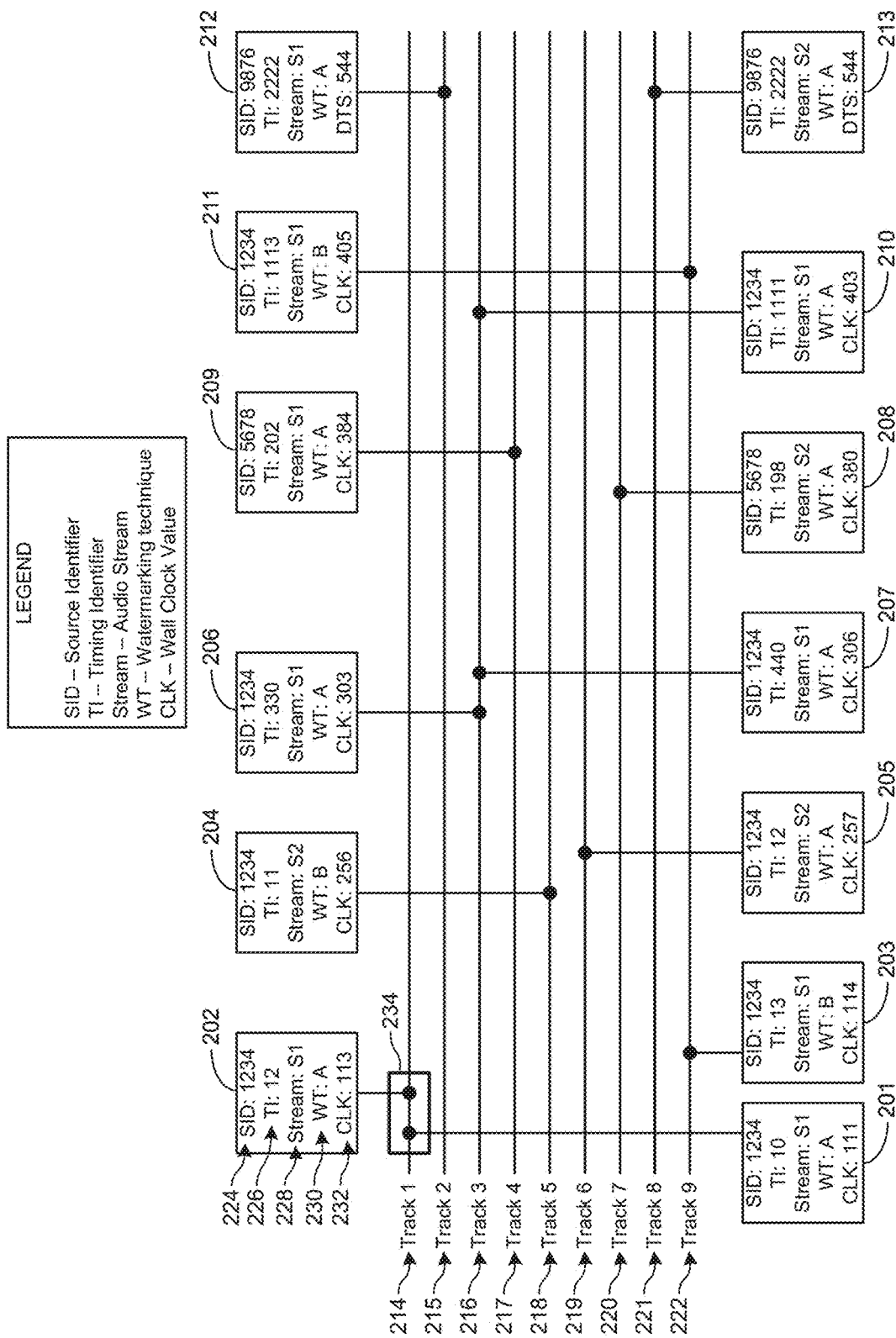
FIG. 2 illustrates an example manner in which the media monitor of FIG. 1 assigns a series of watermarks detected over time to different monitoring tracks.

The limitations used to define media detection events based on consistency of media identifying information, watermarking technology, and audio stream is illustrated in FIG. 2. In particular, FIG. 2 illustrates a series of thirteen watermarks 201, 202, 203, 204, 205, 206, 207, 208, 209, 210, 211, 212, 213 arranged chronologically from left to right. In the illustrated example, as media monitor 112 detects the watermarks 201-213, the watermarks are assigned to a particular monitoring track 214, 215, 216, 217, 218, 219, 220, 221, 222. A monitoring track corresponds to a memory space in which consistent watermarks are temporarily stored as they are detected. Whenever a new watermark is detected it is first compared to watermarks in existing monitoring tracks. If the new watermark is consistent with other watermarks in an existing monitoring track, then the watermark is assigned to that track. If the new watermark is not consistent with previously detected watermarks in any other track, the media monitor 112 generates a new monitoring track and assigns the new watermark to the new track. As described more fully below, media detection events are generated whenever a threshold number of watermarks (e.g., at least two) are assigned to the same track. However, watermarks in separate tracks are not grouped to define a media detection event.

In some examples, the watermarks assigned to a particular track remain assigned to the track only so long as a threshold period of time has not elapsed without a new watermark being assigned to the same monitoring track. The threshold period of time corresponds to the threshold bridge time as described above. Thus, when a new watermark is assigned to a new track, a timer is initiated. If a second watermark is detected that is consistent with the previous watermark before the timer exceeds the threshold bridge time, the second watermark is assigned to the same monitoring track and the timer is reset with the possibility that subsequent watermarks may be detected and added to again reset the timer. As described above, once there are two watermarks in the same track (or some other threshold number), the watermarks are designated as a media detection event. The media detection event will extend to include additional watermarks that are assigned to the same track before the timer has elapsed as outlined above. Once the threshold bridge time has elapsed without another watermark being detected, the media detection event (corresponding to as many watermarks as were assigned to the monitoring track) may be reported to the data collection facility 114. Thereafter, the watermarks stored in the monitoring track are removed so that the monitoring track (e.g., memory space) is made available for a subsequent watermark (or series of watermarks). If the timer exceeds the threshold bridge time before the second watermark is detected such that there is only one watermark assigned to the track when the timer elapses, the watermark is discarded and/or disregarding without forming a media detection event reported to the data collection facility 114. With the single watermark being discarded, the monitoring track is cleared out and made available for subsequent watermarks.

In the illustrated example of FIG. 2, there are nine different monitoring tracks 214-222 because of the inconsistencies between the media identifying information in different ones of the watermarks 201-213 and/or based on differences in the watermarking techniques used to encode the watermarks and/or the audio streams in which the watermarks were embedded. In particular, the parameters associated with each watermark 201-213 include (as shown in FIG. 2 with reference to the second watermark 202) an example source identifier (SID) 224, an example timing identifier (TI) 226, an example audio stream 228, an example watermarking technique (WT) 230, and an example wall-clock value (CLK) 232. The SID 224 and the timing identifier 226 collectively correspond to the media identifying information that is needed to uniquely identify the associated media. The wall-clock value 232 represents the value for a detecting timestamp generated by the media monitor 112 at the time of detection of the corresponding watermark. For the sake of simplicity, the timing identifiers 226 and the wall-clock values 232 for each watermark 201-213 are represented with integer values with each unit increase corresponding to an additional second in time.

For purposes of illustration, as shown in FIG. 2, the watermarks 201-213 are embedded into one of two audio streams designated as either S1 or S2 in the illustrated example using one of two watermarking techniques (WT) designated as either A or B. In the illustrated example, the first and second watermarks 201, 202 are embedded into the same audio stream (S1) using the same watermarking technique (A). Further, the first and second watermarks 201, 202 include consistent media identifying information because they have the same SID (1234) with timing identifiers that are chronologically congruent. As a result of the consistent parameters between the first and second watermarks 201, 202, the watermarks are assigned to the same monitoring track 214. In the illustrated example, a media detection event is defined when at least two consistent watermarks are assigned to the same monitoring track. Accordingly, the first and second watermarks are defined as corresponding to a media detection event represented by the box indicated by reference numeral 234.

For the reasons set forth below, none of the other watermarks 203-213 combine to define additional media detection events because of one or more inconsistencies between the parameters identified for the different watermarks. For example, the third watermark 203 has the same SID (1234) and a chronologically congruent timing identifier to the previous two watermarks 201, 202 such that the media identifying information between all three watermarks is consistent. However, unlike the first two watermarks 201, 202, the third watermark 203 is embedded using a different watermarking technique (B instead of A). As a result, it is assigned to a different track (e.g., the ninth track 222) than the track containing the first two watermarks (e.g., the first track 214). Thus, the third watermark 203 would not be grouped with the previous two watermarks in connection with the media detection event 234.

The fourth watermark 204 is assigned to another new track (e.g., the fifth track 218) because it is chronologically incongruent with the previous watermarks. In particular, the fourth watermark 204 was detected over 100 seconds after the previous three watermarks 201-203 as indicated by the corresponding wall-clock values 232 (indicative of the time of the corresponding detecting timestamps) but the timing identifier 226 of the fourth watermark 204 indicates the watermark was encoded before at least the second and third watermarks 202, 203. Furthermore, even assuming the timing identifier of the fourth watermark 204 was chronologically congruent, the fourth watermark is still placed in a different track because it is embedded in a different audio stream (S2 instead of S1). In some examples, the foregoing analysis for the fourth watermark 204 may be irrelevant because the time interval between the detection of the third watermark 203 and the fourth watermark 204 is greater than the threshold bridge time. For example, the threshold bridge time may be 27 seconds but the time between the detection of the two watermarks is 142 seconds (based on the difference of the wall-clock values 232). Thus, in some such examples, the first and ninth monitoring tracks 214, 222 would be cleared of their corresponding watermarks and made available for new watermarks before the fourth watermark 204 was detected. However, for purposes of explanation, the watermarks 201-213 are represented in the different monitoring tracks 214-222 without regard to the threshold bridge time elapsing between the watermarks.

The fifth watermark 205 is assigned to another new track (e.g., the sixth track 219) because a different watermarking technique (A instead of B) was used to embed the watermark as compared with the fourth watermark 204. Furthermore, the fifth watermark 205 is not grouped with any of the first three watermarks 201-203 because of the different audio stream in which the fifth watermark was embedded. Thus, the fifth watermark 205 does not form part of a media detection event because it cannot be grouped with any other consistent watermark.

As shown in the illustrated example, the sixth and seventh watermarks 206, 207 are assigned to the same monitoring track (e.g., the third monitoring track 216) because their media identifying information is consistent and the watermarks were embedded in the same audio stream using the same watermarking technique. In this example, the chronological congruency between the timing identifiers is limited to their chronological order. While this is sufficient to assign both watermarks to the same monitoring track, the watermarks 206, 207 do not result in a media detection event because the temporal spacing of the timing identifiers is not chronologically congruent relative to the detecting timestamps generated by the media monitor 112 based on the corresponding wall-clock values. In particular, the value for the timing identifier for the seventh watermark 207 is indicated as being 110 seconds after the sixth watermark 206. By contrast, the actual difference in the time of detection between the two watermarks 206, 207 is only three seconds apart. Therefore, the watermarks 206, 207 are discarded without being designated as a media detection event. In other examples, the incongruity of the temporal spacing of the timing identifiers relative to the wall-clock values (e.g., the detecting timestamps) may serve as the basis to assign these two watermarks to different monitoring tracks. In either case, the sixth and seventh watermarks 206, 207 do not result in a media detection event.

The eighth and ninth watermarks 208, 209 have consistent media identifying information with the same SID (5678) and chronologically congruent timing identifiers. However, the media identifying information of the eighth and ninth watermarks 208, 209 is not consistent with the previous seven watermarks 201-207 because the SID is different (5678 instead of 1234). Therefore, the eighth and ninth watermarks 208, 209 are assigned to different monitoring tracks than the previous watermarks 201-207. Furthermore, the eighth and ninth watermarks 208, 209 are assigned to different monitoring tracks relative to one another because they are embedded into different audio streams. As a result, the eighth and ninth watermarks 208, 209 do not result in a media detection event.

The tenth and eleventh watermarks 210, 211 share the same SID as the first seven watermarks 201-207 and are chronologically congruent therewith. Accordingly, in the illustrated example, the tenth watermark 210 is assigned to the third monitoring track 216 that includes the sixth and seventh watermarks 206, 207 because all three watermarks are also embedded in the same audio stream (S1) using the same watermarking technique (A). By contrast, the eleventh watermark 210 is assigned to the ninth monitoring track 222 that includes the third watermark 204 because these watermarks are based on a different watermarking technique (B) than the six, seventh, and tenth watermarks 206, 207, 210. As mentioned above, in many implementations, the similarity of the tenth watermark 210 to the sixth and seventh watermarks 206, 207 and the similarity of the eleventh watermark 211 to the third watermark 203 is irrelevant because the time interval between the watermarks exceeds the threshold bridge time defined for adjacent ones of the watermarks. For example, if the threshold bridge time is 27 seconds, the third monitoring track 216 would be cleared out when the wall-clock value reached 330 and the ninth monitoring track 222 would be cleared out when the wall-clock value reached 131. As shown in the illustrated example, these timeout values occur well before the wall-clock values of 403 and 405 associated with the tenth and eleventh watermarks 210, 211. In such examples, the tenth and eleventh watermarks 210, 211 would be identified as new watermarks that do not correspond to any existing watermarks stored by the media monitor 112 because the associated detecting timestamps are spaced too far apart. As such, the watermarks would be assigned to new monitoring tracks that may or may not be the same as the tracks used for the third, sixth, and seventh watermarks 203, 206, 207. Nevertheless, for purposes of explanation, these watermarks are shown on the same monitoring tracks as outlined above. However, as noted in the illustrated example, the watermarks on the same track do not define a media detection event because they are spaced too far apart (i.e., the time interval between them is greater than the threshold bridge time).

The twelfth and thirteenth watermarks 212, 213 in the illustrated example include a different SID than all the previous watermarks but consistent with each other. In addition to having the same SID, the twelfth and thirteenth watermarks 212, 213 have an identical timing identifier (2222) that was detected at the same time (e.g., the wall-clock value for both watermarks is 544 such that the watermarks also have identical detecting timestamps). These correspond to two watermarks rather than one watermark because they are embedded in different audio streams. However, because the watermarks 212, 213 are in different audio streams, they are assigned to different monitoring tracks and, therefore, do not result in a media detection event.

As outlined above, only a single media detection event 234 is generated from all thirteen watermarks 201-213 of FIG. 1. In particular, the first two watermarks 201, 202 are grouped to define the media detection event 234 while all the other watermarks 203-213 are either spaced too far apart to be combined (that is, the monitoring track would be cleared of the earlier watermarks before the later watermarks are assigned) or isolated on different monitoring tracks due to inconsistencies between the watermarks (based on the media identifying information, the audio stream, and/or the watermarking technique). As a result, each of the last eleven watermarks 203-213 would be discarded as unreliable indicators of the media they are intended to identify. This is an inefficient system that generates a lot of wasted data.

Figure 3:
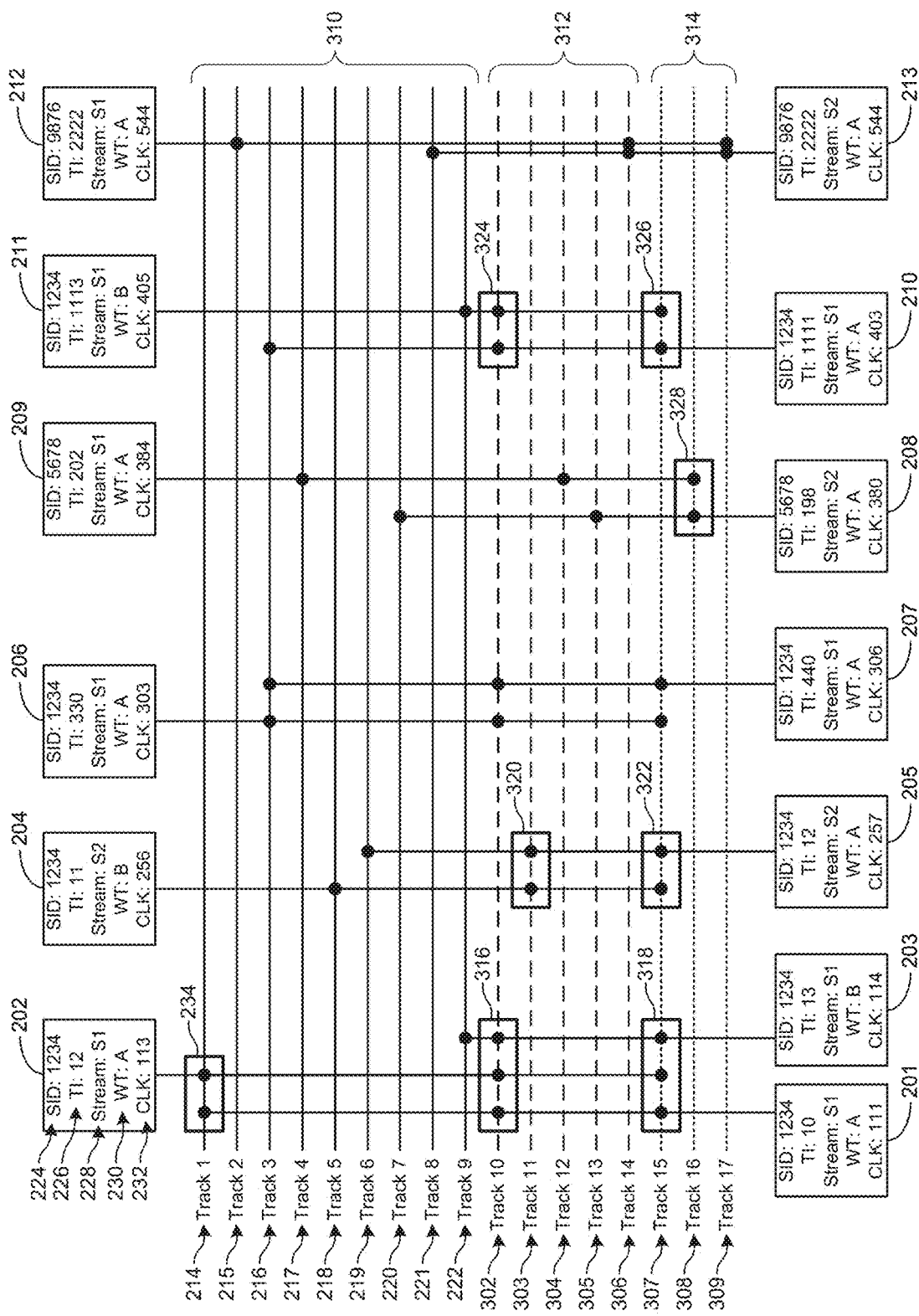
FIG. 3 illustrates an example manner in which the media monitor of FIG. 1 assigns each of the watermarks of FIG. 2 to multiple different monitoring tracks.

Examples disclosed herein improve upon the efficiency of the technical field of media monitoring and reduce the amount of wasted data by matching or grouping watermarks detected across different audio streams and/or across different watermarking technologies. In some examples, this is accomplished by the media monitor 112 assigning each watermark to multiple different monitoring tracks as illustrated in FIG. 3. In particular, FIG. 3 shows the same thirteen watermarks 201-213 assigned to the same monitoring tracks 214-222 as shown in FIG. 2. Additionally, in the illustrated example of FIG. 3, the watermarks 201-213 are also assigned to eight additional monitoring tracks 302, 303, 304, 305, 306, 307, 308, 309. More specifically, in the illustrated example, each watermark 201-213 is assigned to three different tracks including (1) a stream-and-technique-specific monitoring track 310, (2) a stream-specific monitoring track 312, and (3) a generic monitoring track 314.

As used herein, a stream-and-technique-specific monitoring track refers to a track that contains watermarks with consistent media identifying information that are embedded in a specific audio stream using a specific watermarking technique. That is, for two watermarks to be assigned to the same stream-and-technique-specific monitoring track 310, the watermarks need to have the same SID, chronologically congruent timing identifiers, and be embedded in the same audio stream using the same watermarking technology. Thus, as shown in the illustrated example of FIG. 3, the first nine monitoring tracks 214-222 (represented by solid lines) are identified as stream-and-technique-specific monitoring tracks 310. That is, all of the tracks 214-222 shown in FIG. 2 are stream-and-technique-specific monitoring tracks 310.

As used herein, a stream-specific monitoring track refers to a track that contains watermarks with consistent media identifying information that are embedded in a specific audio stream but may be based on any suitable watermarking technique. That is, for two watermarks to be assigned to the same stream-specific monitoring track, the watermarks need to have the same SID, chronologically congruent timing identifiers, and be embedded in the same audio stream. While such watermarks may be embedded using different watermarking techniques, suitable techniques include those that are at least compatible to enable a comparison of the information contained in the watermarks. For example, the different techniques may implement a common time base so that the timing identifiers of the different watermarks can be compared for congruency. In the illustrated example of FIG. 3, the tenth through fourteenth monitoring tracks 302-306 (represented by long-dashed lines) are identified as stream-specific monitoring tracks 312.

As used herein, a generic monitoring track refers to a track that contains watermarks with consistent media identifying information regardless of the audio stream in which they are embedded and regardless of the watermarking technique used to embed the watermarks. That is, for two watermarks to be assigned to the same stream-specific monitoring track, the watermarks need to have the same SID and chronologically congruent timing identifiers. While such watermarks may be embedded in any suitable audio stream using different watermarking techniques, as for the stream-specific monitoring tracks 312, the different techniques may need to be sufficiently compatible so that the media identifying information can be appropriately compared. In the illustrated example of FIG. 3, the fifteenth through seventeenth monitoring tracks 307-309 (represented by short-dashed lines) are identified as generic monitoring tracks 312.

The media monitor 112 may additionally or alternatively assign watermarks to technique-specific monitoring tracks. As used herein, a technique-specific monitoring track refers to a track that contains watermarks with consistent media identifying information that are embedded using the same watermarking technique but not necessarily in the same audio stream. That is, for two watermarks to be assigned to the same technique-specific monitoring track, the watermarks need to have the same SID, chronologically congruent timing identifiers, and be encoded based on the same watermarking technique.

In some examples, when technique-specific monitoring tracks are used, each watermark may be assigned to four separate monitoring tracks rather than three as shown in FIG. 3. In other examples, the watermarks may be assigned to a technique-specific monitoring track in lieu of one of the other three tracks noted above. More generally, the watermarks may be assigned to any combination of one or more of the different types of monitoring tracks noted above in accordance with teachings disclosed herein. For instance, the stream-and-technique-specific tracks may be omitted in some examples.

By assigning the watermarks 201-213 to the different types of tracks noted above, it is possible to identify additional groupings of the watermarks to generate associated media detection events. For example, as noted above in connection with FIG. 2, the first and second watermarks 201, 202 have the same SID, are chronologically congruent, and are embedded in the same audio stream using the same watermarking technique. Thus, they are assigned to the stream-and-technique-specific monitoring 310 corresponding to the first monitoring track 214. The assignment of these watermarks 201, 202 in the first track 214 result in the media detection event 234 as noted above.

In addition to their assignment to the first monitoring track 214, the first and second watermarks 201, 202 are both assigned to the tenth monitoring track 302 because they are associated with the same audio stream and have consistent media identifying information. That is, the tenth monitoring track 302 is a stream-specific track associated with the first audio stream (S1). In the illustrated example, the third, sixth, seventh, tenth, and eleventh watermarks 203, 206, 207, 210, 211 are also assigned to the tenth monitoring track 302 because they are also embedded in the same audio stream and have consistent media identifying information. As can been seen from FIG. 3, the fact that the third and eleventh watermarks 203, 211 were embedded using a different watermarking technology than the other watermarks 201, 202, 206, 207, 210 is irrelevant for the tenth monitoring track 302. As mentioned above, the watermarks that are temporally spaced relatively far apart on the tenth monitoring track 302 (or any other track) is for purposes of illustration. In some examples, each track is cleared of all watermarks when the threshold bridge time has elapsed without a new watermark being assigned to the corresponding track.

In contrast to the watermarks 201-203, 206, 207, 210, 211 shown in the tenth monitoring track 302 of FIG. 3 associated with one audio stream (S1), the fourth and fifth watermarks 204, 205 are associated with a different audio stream (S2). As a result, the fourth and fifth watermarks 204, 205 are assigned to a different stream-specific monitoring track (the eleventh monitoring track 303) corresponding to watermarks with the particular media identifying information embedded in the second audio stream (S2). Notably, both watermarks 204, 205 are assigned to the eleventh monitoring track 303 even though they were embedded using different watermarking techniques because the eleventh track is a stream-specific monitoring track that may include watermarks generated based on different technologies.

Additionally, in some examples, all of the watermarks 201-207, 210, 211 in the tenth and eleventh monitoring tracks 302, 303 are separately assigned to a single generic monitoring track (e.g., the fifteenth monitoring track 307 in FIG. 3). All of these watermarks are assigned to the same generic monitoring track because they satisfy the requirement of having consistent media identifying information. That the watermarks are embedded in different audio streams using different watermarking technique is irrelevant to the assignment to the generic fifteenth monitoring track 307.

The eighth and ninth watermarks 208, 209 include different media identifying information (e.g., a different SID) than the watermarks discussed above. Therefore, the eight and ninth watermarks 208, 209 are assigned to different monitoring tracks. Furthermore, because the eighth and ninth watermarks 208, 209 are embedded in different audio streams (S1 versus S2), they are assigned to separate stream-specific monitoring tracks 312 (e.g., the twelfth and thirteenth monitoring tracks 304, 305). However, the eighth and ninth watermarks 208, 209 are assigned to the same generic monitoring track 314 (e.g., the sixteenth monitoring track 308) because the audio stream is irrelevant for the generic monitoring track 314.

As mentioned above, the twelfth and thirteenth watermarks 212, 213 are detected at the same time and have the same timing identifier. However, the points representative of the assignment to the different monitoring tracks are slightly offset in FIG. 3 for purposes of illustration. In addition to the assignment of the watermarks 212, 213 to their respective stream-and-technique-specific monitoring tracks 215, 221 described above in connection with FIG. 2, both watermarks 212 are assigned to the same stream-specific monitoring track 306 because they were embedded in the same audio stream. Further, both watermarks 212, 213 are assigned to the same generic monitoring track 309, which would be the case even if their audio streams or the associated watermarking techniques were different.

With the assignment of the watermarks 201-213 in the additional monitoring tracks 302-309, many different groupings of the watermarks are possible to form media detection events. As already mentioned, the first and second watermarks 201, 202 define the media detection event 234 in the first monitoring track 214. However, the first and second watermarks 201, 202 define a second media detection event 316 in the tenth monitoring track 302 and a third media detection event 318 in the fifteenth monitoring track 307. Furthermore, as shown in the illustrated example, the third watermark 203 also forms part of the second and third media detection events 316, 318. Thus, unlike in FIG. 2 where the third watermark 203 was separate from the first two watermarks 201, 202 and not used for media identification purposes (i.e., not used to generate a media detection event), the third watermark 203 in FIG. 3 contributes to two separate media detection events. This provides additional data points that can be used to reliably identify the media being monitored. Furthermore, media detection events become more robust or reliable as the number of watermarks associated therewith increases. Thus, the inclusion of the third watermark 203 not only increases the number of media detection events but also provides more robust media detection events.

As described above in connection with FIG. 2, the fourth and fifth watermarks 204, 205 are isolated in different stream-and-technique-specific monitoring tracks 310, thereby preventing the formulation of an associated media detection event. However, the fourth and fifth watermarks 204, 205 are both assigned to the eleventh and fifteenth monitoring tracks 303, 307, thereby enabling the media monitor 112 to identify two additional media detection events 320, 322. A similar result occurs for the tenth and eleventh watermarks 211, 212, with two additional media detection events 324, 326 designated in the tenth and fifteenth monitoring tracks 302, 307. In the illustrated example, the media detection events 318, 322, 326 in the fifteenth monitoring track 307 correspond to three separate events rather than a single event because of the temporal spacing between the separate events is greater than the threshold bridge time. In some examples, the monitoring track 307 would be cleared of the watermarks and associated media detection event after the threshold bridge time elapses such that the watermarks for the different media detection events 318, 322, 326 would not actually be assigned to the same monitoring track (at least not at the same time). However, as explained above, the separate watermarks and separate media detection events are shown in the same monitoring tracks for purposes of explanation.

No media detection events are generated in connection with the sixth and seventh watermarks 206, 207 for the same reason outlined above in connection with FIG. 2. Namely, the temporal spacing of the timing identifiers of the watermarks is inconsistent with the temporal spacing of the corresponding wall-clock values such that the watermarks are not trustworthy. Accordingly, the sixth and seventh watermarks 206, 207 are discarded regardless of the monitoring tracks to which they are assigned.

The eighth and ninth watermarks 208, 209 are embedded in different audio streams and, therefore, are assigned to different stream-specific monitoring tracks 304, 305. As a result, the watermarks included in these tracks do not result in media detection events. However, the eighth and ninth watermarks 208, 209 are also assigned to the same generic monitoring track 308 such that the watermarks still define one additional media detection event 328.

The last two watermarks 212, 213 are a special scenario in which the watermarks have the same media identifying information (both the same SID and the same timing identifier) and are based on the same watermarking technique. These watermarks effectively corresponding to a single watermark that is detected twice because it was embedded in two different audio streams. In some examples, such watermarks are excluded from defining a media detection event by themselves because two instances of a single watermark are no more reliable than detecting a single instance of the watermark. That is, there is the possibility that the detected watermarks are actually a false positive based on a particular noise signal in the media being monitored. Because the same watermarking technology is used for both audio streams, it is likely that the same false positive would be detected in both audio streams. Thus, in some examples, the twelfth and thirteenth watermarks 212, 213 are discarded (unless grouped with other consistent watermarks assigned to the same monitoring track(s)). In other examples, the twelfth and thirteenth watermarks 212, 213 may be used in combination by themselves to designate additional media detection events.

While two watermarks detected at the same time using the same watermarking technique across different audio streams may be suspect, the same concern does not apply to two watermarks detected at the same time across two different watermarking technologies because there is a very low probability that two different watermarking techniques would both simultaneously produce a false positive. Thus, if the twelfth and thirteenth watermarks 212, 213 were based on different technologies, they could reliably be used to validate one another. In such a situation, the separate watermarks would be grouped to define one or more additional media detection events.

As shown by comparison between FIGS. 2 and 3, the same watermarks 201-213 that resulted in only one media detection event 234 in FIG. 2, are combined in the additional monitoring tracks 302-309 of FIG. 3 to produce seven additional media detection events 316, 318, 320, 322, 324, 326, 328 (and potentially more if the last two watermarks are used to define events). These additional media events significantly reduce the amount of watermark data that is wasted by being discarded without defining a media detection relative to the approach shown in FIG. 2. Furthermore, the significant increase in the number of media events (as well as the potential for an increased number of watermarks associated with any particular media event) can increase the reliability with which media is detected. Further still, the increase in the number of media events increases the ability of the media monitor 112 to identify media items having a short duration (e.g., under ten seconds). For example, assume that a particular advertisement is only 5 seconds long, which is long enough to embed at most two watermarks spaced two seconds apart using a particular technology. To identify the media (detect a media detection event) would require the detection of both watermarks. However, if additional watermarks were embedded using different watermarking techniques and/or embedded in additional audio streams, it would be possible to miss the detection of one or more of the initial watermarks and still identify the media by detecting at least two watermarks across the different technologies and/or the different audio streams. Furthermore, even if the watermarks are not embedded every two seconds so that only one watermark was in the 5 second advertisement it would still be possible to reliably identify the advertisement so long as a second watermark was embedded in a separate audio stream and/or using a different watermarking technique.

Figure 4:
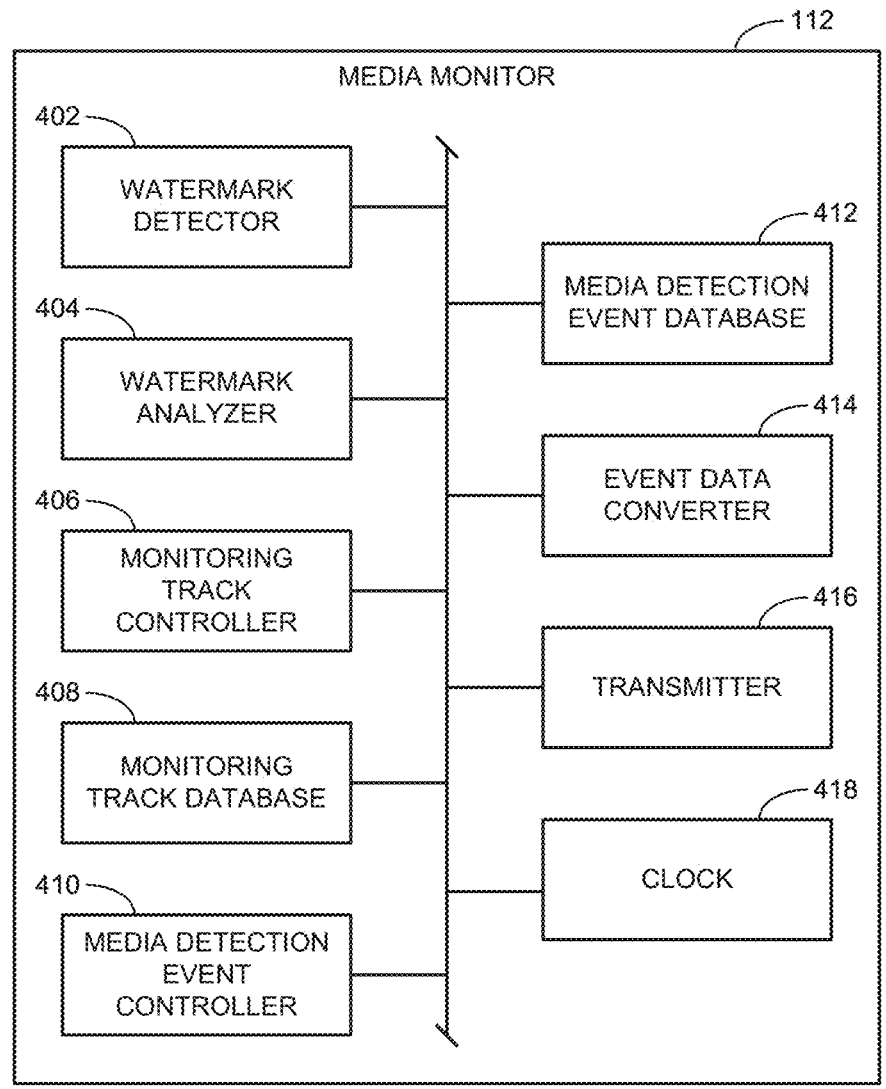
FIG. 4 is a block diagram illustrating an example implementation of the example media monitor of FIG. 1.

FIG. 4 is a block diagram illustrating an example implementation of the example media monitor 112 of FIG. 1. The example media monitor 112 of FIG. 4 includes an example watermark detector 402, an example watermark analyzer 404, an example monitoring track controller 406, an example monitoring track database 408, an example media detection event controller 410, an example media detection event database 412, an example event data converter 414, an example transmitter 416, and an example clock 418.

In the illustrated example, the watermark detector 402 monitors media received by the receiver 110 to detect and extract watermarks embedded therein. In some examples, the watermark detector 402 monitors multiple different audio streams associated with the media for watermarks. Further, as mentioned above, different watermarks may be embedded based on different watermarking techniques. Accordingly, in some examples, the watermark detector 402 implements multiple watermarking techniques to detect and extract watermarks encoded using the different watermarking techniques. In other examples, the media monitor 112 may include multiple watermark detectors associated with different watermarking techniques. When a new watermark is detected and extracted, the watermark detector 402 generates a detecting timestamp indicating the time when the watermark was detected or captured. In some examples, the detecting timestamp is generated based on a wall-clock value obtained from the example clock 418.

The example watermark analyzer 404 analyzes the information contained in the watermark (e.g., media identifying information) and compares it with previously detected watermarks. In some examples, the watermark analyzer 404 compares the media identifying information of separate watermarks to determine whether the media identifying information between the watermarks is consistent. As described above, media identifying information for two watermarks is consistent when there are matching SIDs and the timing identifiers included in the watermarks are chronologically congruent. In some examples, the watermark analyzer 404 determines the chronological congruency of the timing identifiers by comparing the timing identifiers with one another and with the detecting timestamp generated by the watermark detector 402 at the time each watermark was detected. Additionally, the watermark analyzer 404 may compare the watermarking technique associated with a newly detected watermark relative to previously detected watermarks. Further, the watermark analyzer 404 may compare the audio stream from which a newly detected watermark was detected relative to the audio streams corresponding to previously detected watermarks.

Comparison of different watermarks by the watermark analyzer 404 enable the example monitoring track controller 406 to group and/or assign each newly detected watermark to one or more monitoring tracks in the monitoring track database 408. In some examples, the monitoring tracks are different memory spaces in the monitoring track database 408 that enable collected watermarks to be stored in groups based on one or more of their media identifying information, the audio stream from which they were extracted, and/or the watermarking technique used to encode and extract the watermarks. If a newly detected watermark is inconsistent with all previously detected watermarks currently stored in a monitoring track in the monitoring track database 408, the monitoring track database 408 may assign the watermark to a new monitoring track. Periodically, the monitoring track controller 406 discards watermarks stored in different monitoring tracks to clear out the tracks and make them available for subsequently detected watermarks. In some examples, the monitoring track controller 406 discards watermarks in a particular monitoring track based on a threshold bridge time having elapsed during which no new watermarks were assigned to the particular monitoring track. Thus, in some examples, the monitoring track controller 406 initiates a timer using the clock 418 when a new monitoring track is generated and assigned a first watermark and resets the timer each time a new watermark is assigned to the track until the timer exceeds the threshold bridge time.

The example media detection event controller 410 of FIG. 4 analyzes the watermarks stored in the monitoring tracks of the monitoring track database 408 to identify media detection events. A media detection event occurs when a threshold number of watermarks are assigned to the same monitoring track. In some examples, the threshold number is 2 but may be any other suitable number (e.g., 3, 4, 5, etc.). Once the threshold number of watermarks in a single monitoring track have been satisfied, the media detection event controller 410 generates a media detection event that is stored in the media detection event database 412. In some examples, a media detection event includes the SID extracted from the watermarks defining the media detection event and timing information based on the timing identifiers of the watermarks. The media detection event may also include information indicative of the detecting timestamp generated at the time the watermarks were detected. Further, in some examples, the media detection event includes an indication of the number of watermarks associated with the event as well as the audio stream(s) and/or the watermarking technique(s) associated with the watermarks.

As mentioned above, as additional watermarks are detected, they may be assigned to the same monitoring track that is already associated with a media detection event. As such, as new watermarks are assigned to existing monitoring tracks, the example media detection event controller 410 may associate the new watermarks with the corresponding media detection event(s) and update the associated information accordingly.

In some examples, once the threshold bridge time has elapsed in connection with a monitoring track associated with a media detection event, the example event data converter 414 converts the media detection event into a converted format for transmission to the data collection facility 114. For example, the event data converter 414 may encrypt, decrypt, compress, modify, etc., the media detection event to, for example, reduce the amount of data to be transmitted to the data collection facility 114. In some examples, the event data converter 414 combines multiple media detection events together into aggregated event data for transmission to the data collection facility 114. In the illustrated example, the transmitter 416 transmits the converted event data to the data collection facility 114 via, for example, the Internet and/or any other suitable communication means. While the converted event data is transmitted in substantially real-time in the illustrated example, in some examples, the converted event data is stored, cached, and/or buffered before being transmitted to the data collection facility 114.

While an example manner of implementing the media monitor 112 of FIG. 1 is illustrated in FIG. 4, one or more of the elements, processes and/or devices illustrated in FIG. 4 may be combined, divided, re-arranged, omitted, eliminated and/or implemented in any other way. Further, the example watermark detector 402, the example watermark analyzer 404, the example monitoring track controller 406, the example monitoring track database 408, the example media detection event controller 410, the example media detection event database 412, the example event data converter 414, the example transmitter 416, the example clock 418, and/or, more generally, the example media monitor 112 of FIG. 4 may be implemented by hardware, software, firmware and/or any combination of hardware, software and/or firmware. Thus, for example, any of the example watermark detector 402, the example watermark analyzer 404, the example monitoring track controller 406, the example monitoring track database 408, the example media detection event controller 410, the example media detection event database 412, the example event data converter 414, the example transmitter 416, the example clock 418, and/or, more generally, the example media monitor 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark detector 402, the example watermark analyzer 404, the example monitoring track controller 406, the example monitoring track database 408, the example media detection event controller 410, the example media detection event database 412, the example event data converter 414, the example transmitter 416, and/or the example clock 418 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitor 112 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
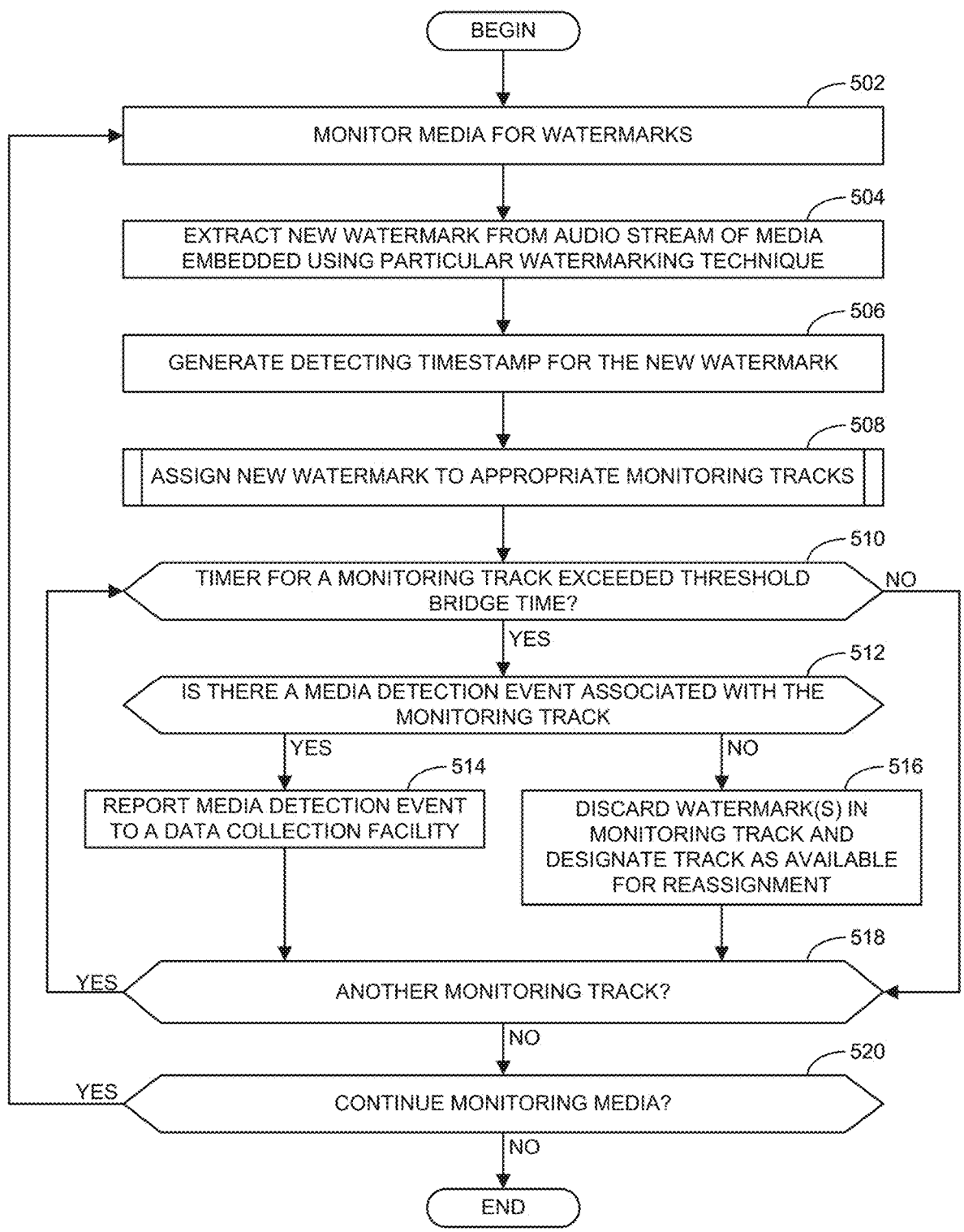
FIGS. 5 and 6 are flowcharts representative of machine readable instructions that may be executed to implement the example media monitor of FIGS. 1 and/or 4.
Figure 6:
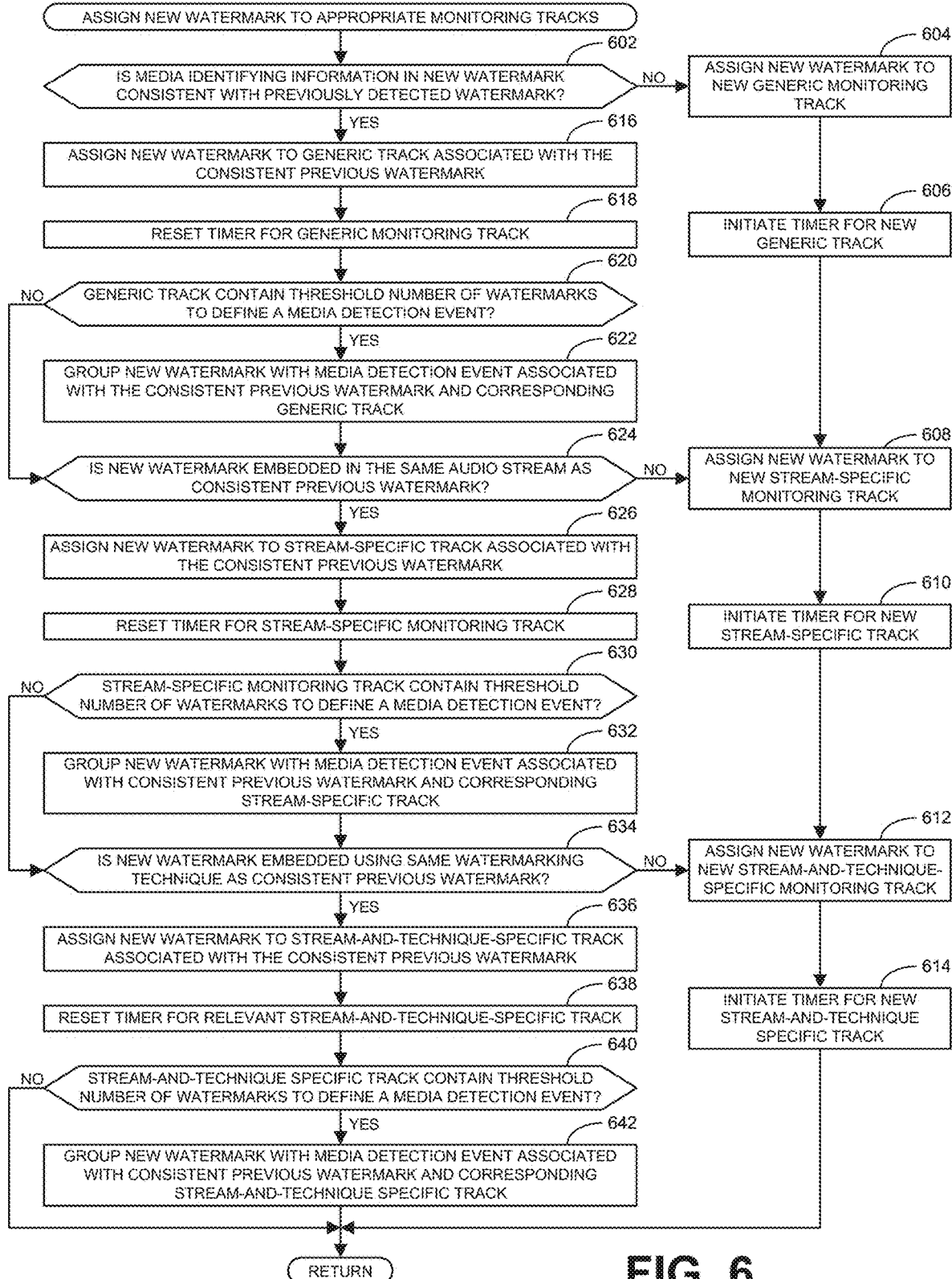

A flowchart representative of example hardware logic, machine readable instructions, hardware implemented state machines, and/or any combination thereof for implementing the media monitor 112 of FIGS. 1 and 4 is shown in FIGS. 5 and 6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 5 and 6, many other methods of implementing the example media monitor 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program of FIG. 5 begins at block 502 where the example watermark detector 402 monitors media for watermarks. As described above, the watermark detector 402 may monitor multiple audio streams associated with the media. Further, the watermark detector 402 may monitor the media for watermarks embedded using different watermarking techniques. At block 504, the example watermark detector 402 extracts a new watermark from an audio stream of the media embedded using a particular watermarking technique. At block 506, the example watermark detector 402 generates a detecting timestamp for the new watermark.

At block 508, the example watermark analyzer 404 assigns the new watermark to appropriate monitoring tracks as explained in further detail in connection with the example program of FIG. 6. Turning to FIG. 6, the example process begins at block 602 where the example watermark analyzer 404 determines whether the media identifying information (e.g., the SID and the timing identifier) in the new watermark are consistent with a previously detected watermark. In some examples, the watermark analyzer 404 compares the media identifying information to all other watermarks currently stored in at least one monitoring track in the monitoring track database 408. In some examples, the watermark analyzer 404 compares the media identifying information with the most recent or last watermark added to each monitoring track without regard to any previously detected watermarks assigned to the same monitoring track because all watermarks in the same track have consistent media identifying information. If the watermark analyzer 404 determines that the media identifying information in the new watermark is not consistent with any previously detected watermark, control advances to block 604.

At block 604, the example monitoring track controller 406 assigns the new watermark to a new generic monitoring track (e.g., one of the generic monitoring tracks 314 of FIG. 3). Thereafter, at block 606, the example monitoring track controller 406 initiates a timer for the new generic track. Further, in some examples, at block 608, the example monitoring track controller 406 assigns the new watermark to a new stream-specific monitoring track (e.g., one of the stream-specific monitoring tracks 312 of FIG. 3). Thereafter, at block 610, the example monitoring track controller 406 initiates a timer for the new stream-specific monitoring track. Further, in some examples, at block 612, the example monitoring track controller 406 assigns the new watermark to a new stream-and-technique-specific monitoring track (e.g., one of the stream-and-technique-specific monitoring tracks 310 of FIG. 3). Thereafter, at block 614, the example monitoring track controller 406 initiates a timer for the new stream-specific monitoring track. While not represented in FIG. 6, the example monitoring track controller 406 may additionally or alternatively assign the new watermark to a new technique-specific monitoring track. Thus, in some examples, the new watermark may be assigned to as many as four different monitoring tracks. In other examples, one or more of the four different monitoring tracks may be omitted. For instance, in some examples, the new watermark may be assigned only to a stream-specific monitoring track. Once the new watermark has been assigned to all relevant monitoring tracks, the example process of FIG. 6 ends and returns to complete the process of FIG. 5.

Returning to block 602 in FIG. 6, if the watermark analyzer 404 determines that the media identifying information in the new watermark is consistent with a previously detected watermark, control advances to block 616. At block 616, the example monitoring track controller 406 assigns the new watermark to the generic monitoring track (e.g., one of the generic monitoring tracks 314 of FIG. 3) associated with the consistent previous watermark. Inasmuch as the generic monitoring track already has at least one watermark assigned to it (e.g., the consistent previous watermark), the monitoring track controller 406 would have already initiated a timer. This would have occurred when the generic monitoring track was generated and assigned its first watermark (corresponding to block 604 and 606 described above). Accordingly, at block 618, the example monitoring track controller 406 resets the timer for the generic monitoring track.

At block 620, the example media detection event controller 410 determines whether the generic monitoring track contains a threshold number of watermarks to define a media detection event. In some examples, the threshold number is two. If the threshold has been satisfied, control advances to block 622 where the example media detection event controller 410 groups the new watermark with a media detection event associated with the consistent previous watermark and the corresponding generic monitoring track. In examples where the new watermark is the first time the threshold number of watermarks has been met, the example media detection event controller 410 generates a new media detection event that is stored in the media detection event database 412. If the threshold number of watermarks has already been satisfied, the media detection event controller 410 may update the previously created media detection event with the new watermark. Once the new watermark is associated with the media detection event, control advances to block 624. Returning to block 620, if the example media detection event controller 410 determines that the generic monitoring track does not contain the threshold number of watermarks, control advances directly to block 624.

At block 624, the example watermark analyzer 404 determines whether the new watermark is embedded in the same audio stream as a consistent previous watermark. If not, control advances to block 608 where the example monitoring track controller 406 assigns the new watermark to a new stream-specific monitoring track. If the new watermark is embedded in the same audio stream as the consistent previous watermark (block 624), control advances to block 626. In some examples, the consistent previous watermark referenced in block 624 may be the same consistent previous watermark as referenced in blocks 616-622. However, in other examples, the consistent previous watermark referenced in block 624 may refer to a different consistent previous watermark.

At block 626, the example monitoring track controller 406 assigns the new watermark to the stream-specific monitoring track (e.g., one of the stream-specific monitoring tracks 312 of FIG. 3) associated with the consistent previous watermark. At block 628, the example monitoring track controller 406 resets the timer for the stream-specific monitoring track. At block 630, the example media detection event controller 410 determines whether the stream-specific monitoring track contains a threshold number of watermarks to define a media detection event. If so, control advances to block 632 where the example media detection event controller 410 groups the new watermark with a media detection event associated with the consistent previous watermark and the corresponding stream-specific monitoring track. Thereafter, control advances to block 634. Returning to block 630, if the example media detection event controller 410 determines that the stream-specific monitoring track does not contain the threshold number of watermarks, control advances directly to block 634.

At block 634, the example watermark analyzer 404 determines whether the new watermark is embedded using the same watermarking technique as a consistent previous watermark. If not, control advances to block 612 where the example monitoring track controller 406 assigns the new watermark to a new stream-and-technique-specific monitoring track. If the new watermark is embedded using the same watermarking technique as the consistent watermarking technique (block 634), control advances to block 636. In some examples, the consistent previous watermark referenced in block 634 may be the same consistent previous watermark as referenced in blocks 616-622 and/or in blocks 624-632. However, in other examples, the consistent previous watermark referenced in block 634 may refer to a different consistent previous watermark to one or both of the consistent previous watermarks referenced in blocks 616-622 and blocks 624-632.

At block 636, the example monitoring track controller 406 assigns the new watermark to the stream-and-technique-specific monitoring track (e.g., one of the stream-and-technique-specific monitoring tracks 310 of FIG. 3) associated with the consistent previous watermark. At block 638, the example monitoring track controller 406 resets the timer for the stream-and-technique-specific monitoring track. At block 640, the example media detection event controller 410 determines whether the stream-and-technique-specific monitoring track contains a threshold number of watermarks to define a media detection event. If so, control advances to block 642 where the example media detection event controller 410 groups the new watermark with a media detection event associated with the consistent previous watermark and the corresponding stream-and-technique-specific monitoring track. Thereafter, the example process of FIG. 6 ends and returns to complete the process of FIG. 5. Returning to block 640, if the example media detection event controller 410 determines that the stream-and-technique-specific monitoring track does not contain the threshold number of watermarks, the example process of FIG. 6 ends and returns to complete the process of FIG. 5.

Returning to FIG. 5, once the new watermark has been assigned to appropriate monitoring tracks (block 508) as detailed in FIG. 6, control advances to block 510. At block 510, the example monitoring track controller 406 determines whether a timer for a monitoring track has exceeded a threshold bridge time. In this example, the timer corresponds to the timers initiated or reset at any one of blocks 606, 610, 614, 618, 628, 638 of FIG. 6. In some examples, the threshold bridge time designates a period of time that may elapse between the detection of watermarks grouped together and assigned to the same track. The threshold bridge time may be set to any suitable duration (e.g., 15 seconds, 27 seconds, 45 seconds, 60 seconds, etc.). If the timer has exceeded the threshold bridge time, control advances to block 512 where the example media detection event controller 410 determines whether there is a media detection event associated with the monitoring track. If so, the example transmitter 416 reports the media detection event to a data collection facility (e.g., the data collection facility 114). In some examples, the media detection event is provided to the event data converter to convert the event and/or combine the event with other media detection events before being reported to the data collection facility. Thereafter, control advances to block 518.

Returning to block 512, if the media detection event controller 410 determines that there is no media detection event associated with the monitoring track, control advances to block 516. At block 516, the example monitoring track controller 406 discards the watermark(s) in the monitoring track and designates the track as available for reassignment. Thereafter, control advances to block 518. Returning to block 510, if the example monitoring track controller 406 determines that the timer for the monitoring track has not exceeded the threshold bridge time, control advances directly to block 518.

At block 518, the example monitoring track controller 406 determines whether there is another monitoring track to analyze. If so, control returns to block 510. Otherwise, control advances to block 520 where the example process determines whether to continue monitoring the media. If so, control returns to block 502. Otherwise, the example process of FIG. 5 ends.

Figure 7:
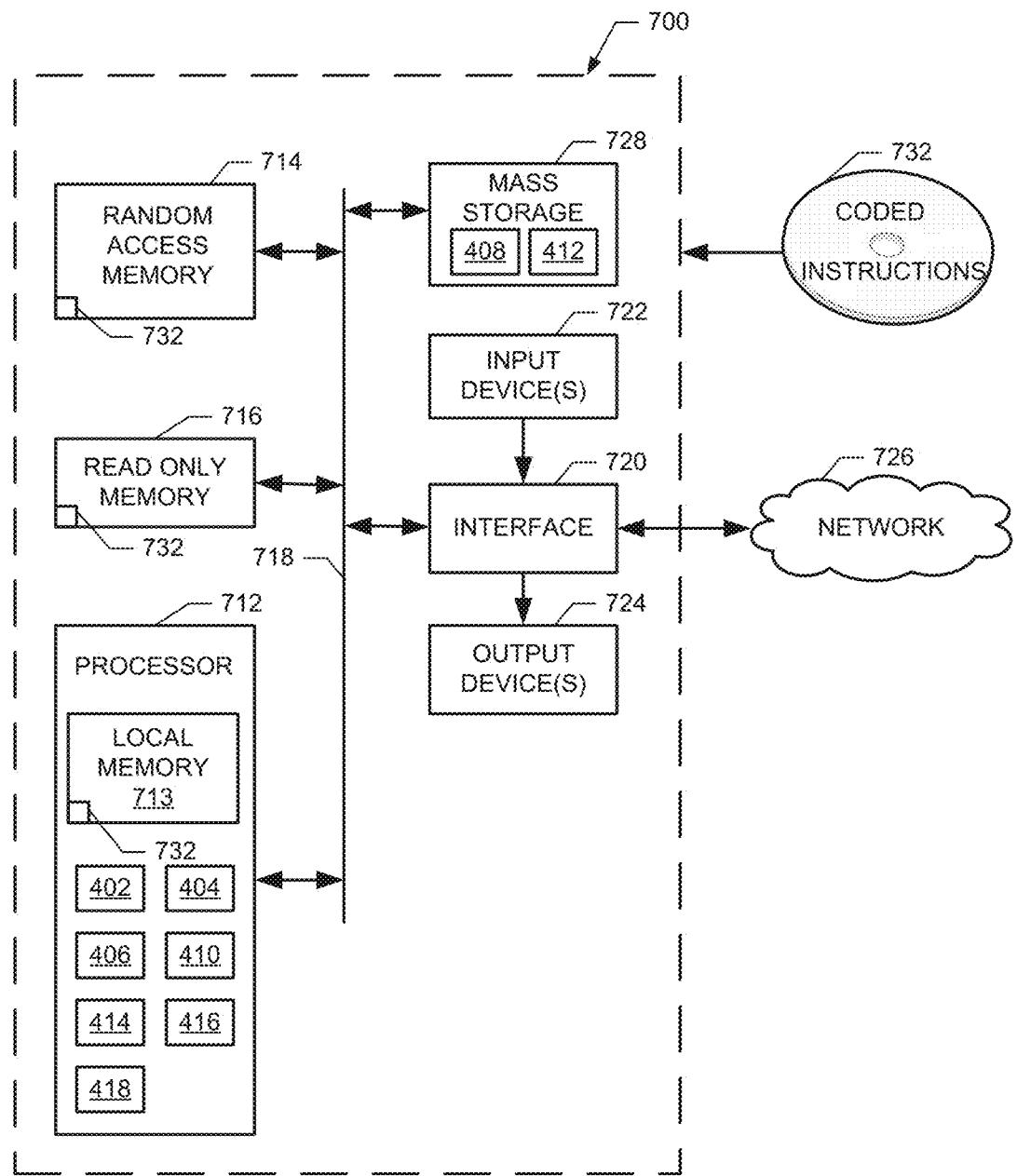
FIG. 7 is a block diagram of an example processing platform structured to execute the instructions of FIGS. 5 and 6 to implement the example media monitor of FIGS. 1 and/or 4.

FIG. 7 is a block diagram of an example processor platform 700 structured to execute the instructions of FIGS. 5 and 6 to implement the media monitor 112 of FIGS. 1 and/or 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements example watermark detector 402, the example watermark analyzer 404, the example monitoring track controller 406, the example media detection event controller 410, the example event data converter 414, the example transmitter 416, the example clock 418.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. In this example, the mass storage device includes, the example monitoring track database 408 and the example media detection event database 412. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus, and articles of manufacture have been disclosed that reduce the amount of wasted or discarded data collected at a media monitoring site by enabling the validation or authentication of watermarks through the grouping of watermarks detected across different audio streams associated with media being monitored and/or across different watermarking techniques. More particularly, rather than disregarding a single watermark detected in a particular audio stream and/or embedded using a particular technology because no other watermarks are detected within a relevant period of time in the same audio stream and/or based on the same watermarking technique, in examples disclosed herein, the watermark may be grouped with other watermarks in different audio streams and/or detected based on different watermarking techniques. A corollary to the reduction in the amount of data that is discarded is an increase in the amount of reliable data (e.g., media detection events) that may be used to identify media being monitored. Furthermore, examples disclosed herein give rise to the possibility of any particular media detection event having a greater number of watermarks associated thereto, thereby increasing the reliability of the collected data. Further, the increased number of media detection events made possible by teachings disclosed herein results in an increased frequency at which such media detection events are likely to be detected. As a result, examples disclosed herein are capable of detecting shorter media items (e.g., advertisements that are less than 10 seconds long) than is technically feasible using known approaches because of the technological limit on the duration or associated frequency at which a single watermark may be embedded in an audio stream and still be concealed from a human exposed to the media.

Example 1 includes an apparatus comprising a watermark detector to detect a first watermark embedded in a first audio stream associated with media and to detect a second watermark embedded in a second audio stream associated with the media, the second audio stream being different than the first audio stream, a watermark analyzer to compare first media identifying information in the first watermark with second media identifying information in the second watermark, a media detection event controller to associate the first and second watermarks with a media detection event when the first media identifying information is consistent with the second media identifying information, and a transmitter to transmit the media detection event to a data collection facility.

Example 2 includes the apparatus as defined in example 1, wherein the first media identifying information includes a first source identifier and a first timing identifier and the second media identifying information includes a second source identifier and a second timing identifier, wherein the first media identifying information is consistent with the second media identifying information when the first source identifier matches the second source identifier and the first and second timing identifiers match an order in which the first and second watermarks were detected.

Example 3 includes the apparatus as defined in example 2, wherein the watermark detector is to assign a first timestamp to the first watermark when the first watermark is detected and to assign a second timestamp to the second watermark when the second watermark is detected, the media detection event controller to associate the first and second watermarks with a media detection when an interval between the first timestamp and the second timestamp is less than a threshold, and to disregard the first and second watermarks when the interval is greater than the threshold.

Example 4 includes the apparatus as defined in example 3, wherein the media detection event controller is to disregard the first and second watermarks when the first timestamp matches the second timestamp.

Example 5 includes the apparatus as defined in any one of examples 1-3, wherein the first watermark is embedded in the first audio stream based on a first watermarking technique and the second watermark is embedded in the second audio stream based on a second watermarking technique.

Example 6 includes the apparatus as defined in example 5, wherein the watermark detector is to detect a third watermark embedded in the first audio stream based on the second watermarking technique, the third watermark embedded in the first audio stream based on the second watermarking technique.

Example 7 includes the apparatus as defined in any one of examples 1-5, further including a monitoring track controller to assign the first watermark to a first monitoring track and a second monitoring track, the first and second monitoring tracks associated with a series of watermarks having consistent media identifying information, the first monitoring track including ones of the series of watermarks embedded in the first audio stream using a first watermarking technique, the second monitoring track including ones of the series of watermarks embedded using the first watermarking technique regardless of the audio stream.

Example 8 includes the apparatus as defined in example 7, wherein the monitoring track controller is to assign the first watermark to a third monitoring track, the third monitoring track including ones of the series of watermarks regardless of the audio stream and regardless of the watermarking technique used to embed the watermarks.

Example 9 includes the apparatus as defined in any one of examples 1-8, wherein the watermark detector monitors both the first and second audio streams at the same time.

Example 10 includes the apparatus as defined in any one of examples 1-9, wherein the first and second audio streams correspond to different representations of audio corresponding to the same visual content of the media.

Example 11 includes a non-transitory computer readable medium comprising instructions that, when executed, cause a machine to at least detect a first watermark embedded in a first audio stream associated with media, detect a second watermark embedded in a second audio stream associated with the media different than the first audio stream, compare first media identifying information in the first watermark with second media identifying information in the second watermark, associate the first and second watermarks with a media detection event when the first media identifying information is consistent with the second media identifying information, and transmit the media detection event to a data collection facility.

Example 12 includes the non-transitory computer readable medium as defined in example 11, wherein the first media identifying information includes a first source identifier and a first timing identifier and the second media identifying information includes a second source identifier and a second timing identifier, the instructions further causing the machine to determine the first media identifying information is consistent with the second media identifying information when the first source identifier matches the second source identifier and the first and second timing identifiers match an order in which the first and second watermarks were detected.

Example 13 includes the non-transitory computer readable medium as defined in example 12, wherein the instructions further cause the machine to assign a first timestamp to the first watermark when the first watermark is detected, assign a second timestamp to the second watermark when the second watermark is detected, associate the first and second watermarks with a media detection when an interval between the first timestamp and the second timestamp is less than a threshold, and disregard the first and second watermarks when the interval is greater than the threshold.

Example 14 includes the non-transitory computer readable medium as defined in any one of examples 11-13, wherein the instructions further cause the machine to detect the first watermark based on a first watermarking technique, and detect the second watermark based on a second watermarking technique different than the first watermarking technique, the first watermark embedded in the first audio stream based on the first watermarking technique and the second watermark embedded in the second audio stream based on the second watermarking technique.

Example 15 includes the non-transitory computer readable medium as defined in example 14, wherein the instructions further cause the machine to detect a third watermark embedded in the first audio stream based on the second watermarking technique, the third watermark embedded in the first audio stream based on the second watermarking technique.

Example 16 includes the non-transitory computer readable medium as defined in any one of examples 11-15, wherein the instructions further cause the machine to assign the first watermark to a first monitoring track and a second monitoring track, the first and second monitoring tracks associated with a series of watermarks having consistent media identifying information, the first monitoring track including ones of the series of watermarks embedded in the first audio stream using a first watermarking technique, the second monitoring track including ones of the series of watermarks embedded using the first watermarking technique regardless of the audio stream.

Example 17 includes the non-transitory computer readable medium as defined in example 16, wherein the instructions further cause the machine to assign the first watermark to a third monitoring track, the third monitoring track including ones of the series of watermarks regardless of the audio stream and regardless of the watermarking technique used to embed the watermarks.

Example 18 includes a method comprising detecting, by executing an instruction with a processor, a first watermark embedded in a first audio stream associated with media, detecting, by executing an instruction with the processor, a second watermark embedded in a second audio stream associated with the media different than the first audio stream, comparing, by executing an instruction with the processor, first media identifying information in the first watermark with second media identifying information in the second watermark, associating, by executing an instruction with the processor, the first and second watermarks with a media detection event when the first media identifying information is consistent with the second media identifying information, and transmitting the media detection event to a data collection facility.

Example 19 includes the method as defined in example 18, wherein the first media identifying information includes a first source identifier and a first timing identifier and the second media identifying information includes a second source identifier and a second timing identifier, the method further including determining the first media identifying information is consistent with the second media identifying information when the first source identifier matches the second source identifier and the first and second timing identifiers match an order in which the first and second watermarks were detected.

Example 20 includes the method as defined in example 19, further including assigning a first timestamp to the first watermark when the first watermark is detected, assigning a second timestamp to the second watermark when the second watermark is detected, associating the first and second watermarks with a media detection when an interval between the first timestamp and the second timestamp is less than a threshold, and disregarding the first and second watermarks when the interval is greater than the threshold.

Example 21 includes the method as defined in any one of examples 18-20, further including detecting the first watermark based on a first watermarking technique, and detecting the second watermark based on a second watermarking technique different than the first watermarking technique, the first watermark embedded in the first audio stream based on the first watermarking technique and the second watermark embedded in the second audio stream based on the second watermarking technique.

Example 22 includes the method as defined in any one of examples 18-21, further including assigning the first watermark to a first monitoring track and a second monitoring track, the first and second monitoring tracks associated with a series of watermarks having consistent media identifying information, the first monitoring track including ones of the series of watermarks embedded in the first audio stream using a first watermarking technique, the second monitoring track including ones of the series of watermarks embedded using the first watermarking technique regardless of the audio stream.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system comprising:
  a processor; and
  a non-transitory computer-readable storage medium, having stored thereon program instructions that, upon execution by the processor, cause performance of a set of operations comprising:
    assigning a first watermark to a first monitoring track and a second monitoring track, the second monitoring track distinct from the first monitoring track, the first watermark detected in an audio stream of media;
    grouping, based on at least a first threshold number of watermarks being assigned to the first monitoring track, the first watermark with one or more other watermarks assigned to the first monitoring track to define a first media detection event;
    grouping, based on at least a second threshold number of watermarks being assigned to the second monitoring track, the first watermark with one or more other watermarks assigned to the second monitoring track to define a second media detection event; and
    causing transmission of the first media detection event and the second media detection event to a data collection facility.

2. The computing system of claim 1, wherein the first threshold number of watermarks equals the second threshold number of watermarks.

3. The computing system of claim 1, wherein the audio stream is a first audio stream, and wherein all watermarks assigned to the first monitoring track are obtained from the first audio stream, ones of the one or more other watermarks assigned to the second monitoring track are obtained from a second audio stream of the media, the second audio stream different than the first audio stream.

4. The computing system of claim 1, wherein the one or more other watermarks assigned to the first monitoring track correspond to a first quantity of watermarks, and wherein the one or more other watermarks assigned to the second monitoring track correspond to a second quantity of watermarks, the second quantity of watermarks less than the first quantity of watermarks.

5. The computing system of claim 1, the set of operations further comprising:
at least one of resetting or initiating a timer when the first watermark is assigned to the first monitoring track; and
causing transmission of the first media detection event to the data collection facility based on the timer reaching a threshold time.

6. The computing system of claim 5, the set of operations further comprising:
discarding the first watermark from the first monitoring track without forming the first media detection event based on the timer reaching the threshold time without at least the first threshold number of watermarks being assigned to the first monitoring track.

7. The computing system of claim 1, wherein the second monitoring track is empty prior to assignment of the first watermark to the second monitoring track, and wherein the set of operations further comprise assigning the first watermark to the second monitoring track and not another monitoring track containing one or more previously detected watermarks based on at least one of (i) a difference in a watermarking technique used to embed the first watermark in the media relative to the one or more previously detected watermarks or (ii) a difference in the audio stream in which the first watermark was embedded relative to the one or more previously detected watermarks.

8. A non-transitory computer-readable storage medium, having stored thereon program instructions that, upon execution by a processor, cause performance of a set of operations comprising:
assigning a first watermark to a first monitoring track and a second monitoring track, the second monitoring track distinct from the first monitoring track, the first watermark detected in an audio stream of media;
grouping, based on at least a first threshold number of watermarks being assigned to the first monitoring track, the first watermark with one or more other watermarks assigned to the first monitoring track to define a first media detection event;
grouping, based on at least a second threshold number of watermarks being assigned to the second monitoring track, the first watermark with one or more other watermarks assigned to the second monitoring track to define a second media detection event; and
causing transmission of the first media detection event and the second media detection event to a data collection facility.

9. The non-transitory computer-readable storage medium of claim 8, wherein the first threshold number of watermarks equals the second threshold number of watermarks.

10. The non-transitory computer-readable storage medium of claim 8, wherein the audio stream is a first audio stream, and wherein all watermarks assigned to the first monitoring track are obtained from the first audio stream, ones of the one or more other watermarks assigned to the second monitoring track are obtained from a second audio stream of the media, the second audio stream different than the first audio stream.

11. The non-transitory computer-readable storage medium of claim 8, wherein the one or more other watermarks assigned to the first monitoring track correspond to a first quantity of watermarks, and wherein the one or more other watermarks assigned to the second monitoring track correspond to a second quantity of watermarks, the second quantity of watermarks less than the first quantity of watermarks.

12. The non-transitory computer-readable storage medium of claim 8, set of operations further comprising:
at least one of resetting or initiating a timer when the first watermark is assigned to the first monitoring track; and
causing transmission of the first media detection event to the data collection facility based on the timer reaching a threshold time.

13. The non-transitory computer-readable storage medium of claim 12, the set of operations further comprising:
discarding the first watermark from the first monitoring track without forming the first media detection event based on the timer reaching the threshold time without at least the first threshold number of watermarks being assigned to the first monitoring track.

14. The non-transitory computer-readable storage medium of claim 8, wherein the second monitoring track is empty prior to assignment of the first watermark to the second monitoring track, and wherein the set of operations further comprise assigning the first watermark to the second monitoring track and not another monitoring track containing one or more previously detected watermarks based on at least one of (i) a difference in a watermarking technique used to embed the first watermark in the media relative to the previously detected watermarks or (ii) a difference in the audio stream in which the first watermark was embedded relative to the one or more previously detected watermarks.

15. A method comprising:
assigning, by executing instructions with a processor, a first watermark to a first monitoring track and a second monitoring track, the second monitoring track distinct from the first monitoring track, the first watermark detected in an audio stream of media;
grouping, based on at least a first threshold number of watermarks being assigned to the first monitoring track, the first watermark with one or more other watermarks assigned to the first monitoring track to define a first media detection event;
grouping, based on at least a second threshold number of watermarks being assigned to the second monitoring track, the first watermark with one or more other watermarks assigned to the second monitoring track to define a second media detection event; and
transmitting the first media detection event and the second media detection event to a data collection facility.

16. The method of claim 15, wherein the first threshold number of watermarks equals the second threshold number of watermarks.

17. The method of claim 15, wherein the audio stream is a first audio stream, and wherein all watermarks assigned to the first monitoring track are obtained from the first audio stream, ones of the one or more other watermarks assigned to the second monitoring track are obtained from a second audio stream of the media, the second audio stream different than the first audio stream.

18. The method of claim 15, wherein the one or more other watermarks assigned to the first monitoring track correspond to a first quantity of watermarks, and wherein the one or more other watermarks assigned to the second monitoring track correspond to a second quantity of watermarks, the second quantity of watermarks less than the first quantity of watermarks.

19. The method of claim 15, further comprising:
at least one of resetting or initiating a timer when the first watermark is assigned to the first monitoring track; and
transmitting the first media detection event to the data collection facility based on the timer reaching a threshold time.

20. The method of claim 19, further comprising:
discarding the first watermark from the first monitoring track without forming the first media detection event based on the timer reaching the threshold time without at least the first threshold number of watermarks being assigned to the first monitoring track.

* * * * *